United States Patent
Platais et al.

(10) Patent No.: US 12,405,805 B2
(45) Date of Patent: Sep. 2, 2025

(54) SYSTEMS AND METHODS FOR PROCESSING INCIDENT DATA THROUGH A DATA PIPELINE

(71) Applicant: Fidelity Information Services, LLC, Jacksonville, FL (US)

(72) Inventors: John C. Platais, Menomonee Falls, WI (US); Ranadhir Ghosh, St Johns, FL (US)

(73) Assignee: Fidelity Information Services, LLC, Jacksonville, FL (US)

( * ) Notice: Subject to any disclaimer, the term of this patent is extended or adjusted under 35 U.S.C. 154(b) by 97 days.

(21) Appl. No.: 18/478,106

(22) Filed: Sep. 29, 2023

(65) Prior Publication Data
US 2025/0110746 A1  Apr. 3, 2025

(51) Int. Cl.
*G06F 9/38* (2018.01)
(52) U.S. Cl.
CPC .................................. *G06F 9/3869* (2013.01)
(58) Field of Classification Search
None
See application file for complete search history.

(56) References Cited

U.S. PATENT DOCUMENTS

2025/0013657 A1 * 1/2025 Farooq .................. G06F 16/215

* cited by examiner

*Primary Examiner* — Scott C Sun
(74) *Attorney, Agent, or Firm* — Bookoff McAndrews, PLLC

(57) ABSTRACT

A computer implemented method for processing data through a data pipeline is disclosed. The method includes: receiving, by a collection point, data from one or more data sources, the collection point being configured to at least one of extract, transform, or load the data; transferring the data from the collection point to a front gate processor, the front gate processor being configured to process the data; transferring the processed data from the front gate processor to a data storage system, the data storage system being configured to store the processed data; transferring the processed data from the front gate processor to a processing platform; and transferring the processed data from the processing platform to one or more data sink layers, each of the one or more data sink layers being configured to provide short term storage of the processed data.

20 Claims, 4 Drawing Sheets

SYSTEMS AND METHODS FOR PROCESSING INCIDENT DATA THROUGH A DATA PIPELINE

TECHNICAL FIELD

Various embodiments of the present disclosure relate generally to processing incident data and, more particularly, processing incident data through a data pipeline.

BACKGROUND

Changes to any type of system creates some degree of risk that the system will not continue to perform as expected. Additionally, even if system performance is not immediately affected, a change to a system may cause issues later, and a significant amount of time and resources may need to be expended to determine what caused the change in performance of the system.

For example, in software, deploying, refactoring, or releasing software code has different kinds of associated risk depending on what code is being changed. Not having a clear view of how vulnerable or risky a certain code deployment may be increases the risk of system outages. A technology shift is a big event for any product, and entails a large risk as well as opportunity for a software company.

Outages and/or incidents cost companies money in service-level agreement payouts but, more importantly, wastes time for personnel via rework, and may risk adversely affecting a company's reputation with its customers. Highest costs are attributed to bugs reaching production, including a ripple effect and a direct cost on all downstream teams. Also, after a modification has been deployed, an incident team may waste time determining what caused a change in performance of a system.

Information Technology (IT) operations, such as performing change requests, can have varying levels of risk and impact. In large IT organizations, change-caused incidents may make up 70-80% of critical incidents, and hence cause a significant burden on IT teams. Modern IT architectures have become increasingly complex. Resolving recurring incidents in a large system across the IT landscape frequently involves decentralized personnel and systems, and individual ticket and time-separated resolutions, resulting in significant inefficiencies in large IT organizations. Moreover, many IT systems are only able to process specific forms of data leading to inefficiencies.

The present disclosure is directed to overcoming one or more of the above-referenced challenges.

SUMMARY OF THE DISCLOSURE

It is to be understood that both the foregoing general description and the following detailed description are exemplary and explanatory only and are not restrictive of the disclosed embodiments, as claimed.

In some aspects, the techniques described herein related to a method for processing data through a data pipeline, the method performed by one or more processors and including: receiving, by a collection point, data from one or more data sources, the collection point being configured to at least one of extract, transform, or load the data; transferring the data from the collection point to a front gate processor, the front gate processor being configured to process the data; transferring the processed data from the front gate processor to a data storage system, the data storage system being configured to store the processed data; transferring the processed data from the front gate processor to a processing platform, the processed data transferred from the front gate processor to a processing platform comprising data that has been categorized by the front gate processor, the processing platform being configured to apply one or more real-time processing techniques including filtering the processed data; and transferring the processed data from the processing platform to one or more data sink layers, each of the one or more data sink layers being configured to provide short term storage of the processed data in an optimized format and to output the processed data to an artificial intelligence module.

In some aspects, the techniques described herein related to a method, wherein the one or more data sources include data from a cloud-based environment and/or an in-house system.

In some aspects, the techniques described herein related to a method, wherein when the data is received from the cloud-based environment, the data is transferred to a secondary collection point configured to perform additional processing of the data prior to the collection point receiving the data.

In some aspects, the techniques described herein related to a method, wherein the data from the one or more data sources includes at least one of: incident data, alert data, or change data.

In some aspects, the techniques described herein related to a method, wherein the data from the one or more data sources includes data that has multiple formats.

In some aspects, the techniques described herein related to a method, wherein the data from the one or more data sources changes format during the receiving of the data.

In some aspects, the techniques described herein related to a method, wherein the processing of the data by the front gate processor may include: categorizing the data into a plurality of client categories, thereby forming a plurality of datasets associated with the respective client categories, wherein the plurality of datasets are stored separately in the data storage system In some aspects, the techniques described herein related to a method, wherein transferring the processed data from the processing platform to one or more data sink layers includes transferring the plurality of datasets to a plurality of data sink layers based on the associated respective client categories.

In some aspects, the techniques described herein related to a method, the method may further include: determining that data is no longer being received by the collection point; and upon determining that data is no longer being received by the collection point, transferring processed data from the data storage system to the processing platform.

In some aspects, the techniques described herein related to a method, wherein the processed data transferred from the front gate processor to the processing platform includes stream processing data and batch processing data.

In some aspects, the techniques described herein related to a method, further including: transferring the processed data from the one or more data sink layers to one or more machine learning systems.

In some aspects, the techniques described herein related to a system for a data pipeline, the system including a memory having processor-readable instructions stored therein; and at least one processor configured to access the memory and execute the processor-readable instructions to perform operations including: receiving, by a collection point, data from one or more data sources, the collection point being configured to at least one of extract, transform, or load the data; transferring the data from the collection point to a front gate processor, the front gate processor being configured to process the data; transferring the processed data from the front gate processor to a data storage system, the data storage system being configured to store the processed data; transferring the processed data from the front gate processor to a processing platform, the processed data transferred from the front gate processor to a processing platform comprising data that has been categorized by the front gate processor, the processing platform being configured to apply one or more real-time processing techniques including filtering the processed data; and transferring the processed data from the processing platform to one or more data sink layers, each of the one or more data sink layers being configured to provide short term storage of the processed data in an optimized format and to output the processed data to an artificial intelligence module.

In some aspects, the techniques described herein relate to a system, wherein the one or more data sources include data from a cloud-based environment and/or an in-house system.

In some aspects, the techniques described herein relate to a system, wherein when the data is received from the cloud-based environment, the data is transferred to a secondary collection point configured to perform additional processing of the data prior to the collection point receiving the data.

In some aspects, the techniques described herein relate to a system, wherein the data from the one or more data sources includes at least one of: incident data, alert data, or change data.

In some aspects, the techniques described herein relate to a system, wherein the data from the one or more data sources includes data that has multiple formats.

In some aspects, the techniques described herein relate to a system, wherein the data from the one or more data sources changes format during the receiving of the data.

In some aspects, the techniques described herein relate to a system, wherein the processing of the data by the front gate processor includes: categorizing the data into a plurality of client categories, thereby forming a plurality of datasets associated with the respective client categories, wherein the plurality of datasets are stored separately in the data storage system.

In some aspects, the techniques described herein relate to a system, wherein transferring the processed data from the processing platform to one or more data sink layers includes transferring the plurality of datasets to a plurality of data sink layers based on the associated respective client categories.

In some aspects, the techniques described herein relate to a non-transitory computer readable medium storing processor-readable instructions which, when executed by at least one processor, cause the at least one processor to perform operations including: receiving, by a collection point, data from one or more data sources, the collection point being configured to at least one of extract, transform, or load the data; transferring the data from the collection point to a front gate processor, the front gate processor being configured to process the data; transferring the processed data from the front gate processor to a data storage system, the data storage system being configured to store the processed data; transferring the processed data from the front gate processor to a processing platform, the processed data transferred from the front gate processor to a processing platform comprising data that has been categorized by the front gate processor, the processing platform being configured to apply one or more real-time processing techniques including filtering the processed data; and transferring the processed data from the processing platform to one or more data sink layers, each of the one or more data sink layers being configured to provide short term storage of the processed data in an optimized format and to output the processed data to an artificial intelligence module.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
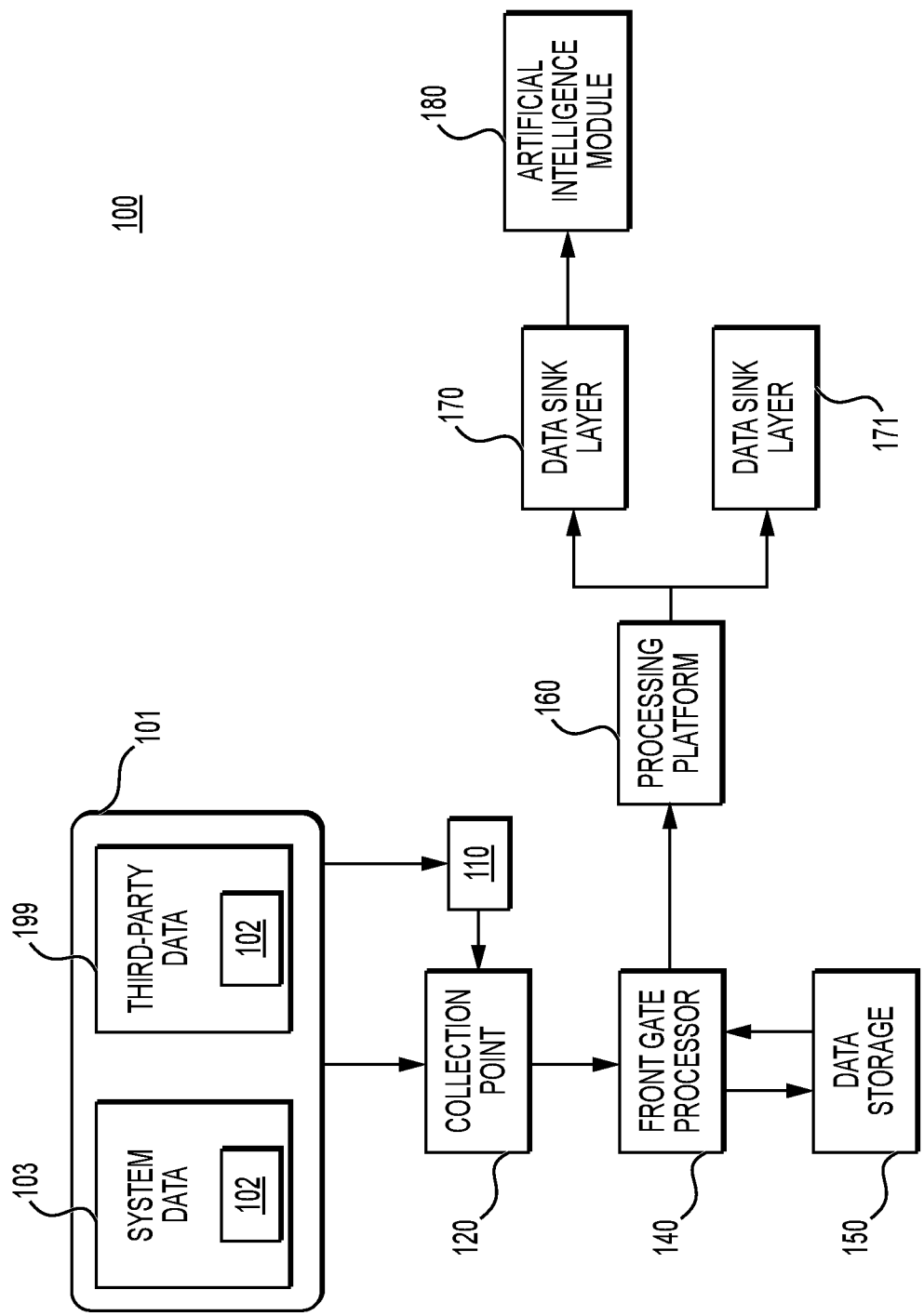
FIG. 1 depicts an exemplary system overview for a data pipeline for data transfer and aggregation, according to one or more embodiments.

Various embodiments of the present disclosure relate generally to processing incident data and, more particularly, processing incident data through a data pipeline.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment"

as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Software companies have been struggling to avoid outages from incidents that may be caused by upgrading software or hardware components, or changing a member of a team, for example.

One or more embodiments disclosed herein may aggregate and transfer data to reduce a burden on a company to identify and resolve incidents. In the context of the present disclosure, an incident may be any change in a system, such as an outage or a performance change, for example. Incidents may be manually reported by customers or personnel, may be automatically logged by internal systems, or may be captured in other ways. One or more embodiments may provide IT management, governance, and operations with a solution to identify and resolve incidents and have an impact in an ongoing, dynamic way. One or more embodiments may be extended to clients and users of services and software with applications that are connected to the system described herein. One or more embodiments may provide a data agnostic tool to ingest, process, and analyze large amounts of data. One or more embodiments may provide a data pipeline (e.g., a software platform) configured to receive data from a data source, transfer and process data, and provide the processed data to one or more data sink layers. One or more embodiments may allow for the aggregation, correlation, and resolution options by ingesting, storing, and processing data inputs. The data inputs may be, for example, from enterprise class and commercial tools and correspond to incident-related data. One or more embodiments may allow for various types of data processing in order to identify correlations, similarity, and root causes, and recommend a corrective action based on received data as well as user feedback mechanisms.

One or more embodiments may leverage a combination of open source software solution to collect third party data and system level data via a collection point. The data may then be transferred from a collection point to a front gate processor where data may then be transferred to a data storage system for long term storage and retrieval. The front gate processor may further transfer the data to a processing platform where the raw data may be aggregated and preprocessed. The data may then be transferred to one or more data sinks, where the data may be retrieved by one or more machine learning systems, which may be configured to evaluate the data utilizing machine learning algorithms including, but not limited to, Natural Language Processing, Graph Embedding, Association Rule Modeling, and Anomaly Detection. Then, based on user requirements, the machine learning systems may provide outputs via application programming interfaces (APIs), which may then trigger automation, update systems of record, or provide user insight via a presentation layer.

FIG. 1 depicts an exemplary system overview for a data pipeline for data transfer and aggregation, according to one or more embodiments. The data pipeline system 100 may be a platform with multiple interconnected components. The data pipeline system 100 may include one or more servers, intelligent networking devices, computing devices, components, and corresponding software for aggregating and processing data.

As shown in FIG. 1, a data pipeline system 100 may include a data source 101, a collection point 120, a secondary collection point 110, a front gate processor 140, data storage 150, a processing platform 160, a data sink layer 170, a data sink layer 171, and an artificial intelligence module 180.

The data source 101 may include in-house data 103 and third party data 199. The in-house data 103 may be a data source directly linked to the data pipeline system 100. Third party data 199 may be a data source connected to the data pipeline system 100 externally as will be described in greater detail below.

Both the in-house data 103 and third party data 199 of the data source 101 may include incident data 102. Incident data 102 may include incident reports with information for each incident provided with one or more of an incident number, closed date/time, category, close code, close note, long description, short description, root cause, or assignment group. Incident data 102 may include incident reports with information for each incident provided with one or more of an issue key, description, summary, label, issue type, fix version, environment, author, or comments. Incident data 102 may include incident reports with information for each incident provided with one or more of a file name, script name, script type, script description, display identifier, message, committer type, committer link, properties, file changes, or branch information. Incident data 102 may include one or more of real-time data, market data, performance data, historical data, utilization data, infrastructure data, or security data. These are merely examples of information that may be used as data, and the disclosure is not limited to these examples.

Incident data 102 may be generated automatically by monitoring tools that generate alerts and incident data to provide notification of high-risk actions, failures in IT environment, and may be generated as tickets. Incident data may include metadata, such as, for example, text fields, identifying codes, and time stamps.

The in-house data 103 may be stored in a relational database including an incident table. The incident table may be provided as one or more tables, and may include, for example, one or more of problems, tasks, risk conditions, incidents, or changes. The relational database may be stored in a cloud. The relational database may be connected through encryption to a gateway. The relational database may send and receive periodic updates to and from the cloud. The cloud may be a remote cloud service, a local service, or any combination thereof. The cloud may include a gateway connected to a processing API configured to transfer data to the collection point 120 or a secondary collection point 110. The incident table may include incident data 102.

Data pipeline system 100 may include third party data 199 generated and maintained by third party data producers. Third party data producers may produce incident data 102 from Internet of Things (IoT) devices, desktop-level devices, and sensors. Third party data producers may include but are not limited to Tryambak, Appneta, Oracle, Prognosis, ThousandEyes, Zabbix, ServiceNow, Density, Dyatrace, etc. The incident data 102 may include metadata indicating that the data belongs to a particular client or associated system.

The data pipeline system 100 may include a secondary collection point 110 to collect and pre-process incident data 102 from the data source 101. The secondary collection point 110 may be utilized prior to transferring data to a collection point 120. The secondary collection point 110 point may for example be an Apache Minifi software. In one example, the secondary collection point 110 may run on a microprocessor for a third party data producer. Each third party data producer may have an instance of the secondary collection point 110 running on a microprocessor. The secondary collection point 110 may support data formats including but limited to JSON, CSV, Avro, ORC, HTML, XML, and Parquet. The secondary collection point 110 may encrypt incident data 102 collected from the third party data producers. The secondary collection point 110 may encrypt incident data, including, but not limited through Mutual Authentication Transport Layer Security (mTLS), HTTPs, SSH, PGP, IPsec, and SSL. The secondary collection point 110 may perform initial transformation or processing of incident data 102. The secondary collection point 110 may be configured to collect data from a variety of protocols, have data provenance generated immediately, apply transformations and encryptions on the data, and prioritize data.

The data pipeline system 100 may include a collection point 120. The collection point 120 may be a system configured to provide a secure framework for routing, transforming, and delivering data across from the data source 101 to downstream processing devices (e.g., the front gate processor 140). The collection point 120 may for example be a software such as Apache NiFi. The collection point 120 may receive raw data and the data's corresponding fields such as the source name and ingestion time. The collection point 120 may run on a Linux Virtual Machine (VM) on a remote server. The collection point 120 may include one or more nodes. For example, the collection point 120 may receive incident data 102 directly from the data source 101. In another example, the collection point 120 may receive incident data 102 from the secondary collection point 110. The secondary collection point 110 may transfer the incident data 102 to the collection point 120 using, for example, Site-to-Site protocol. The collection point 120 may include a flow algorithm. The flow algorithm may connect different processors, as described herein, to transfer and modify data from one source to another. For each third party data producer, the collection point 120 may have a separate flow algorithm. Each flow algorithm may include a processing group. The processing group may include one or more processors. The one or more processors may, for example, fetch incident data 102 from the relational database. The one or more processors may utilize the processing API of the in-house data 103 to make an API call to a relational database to fetch incident data 102 from the incident table. The one or more processors may further transfer incident data 102 to a destination system such as a front gate processor 140. The collection point 120 may encrypt data through HTTPS, Mutual Authentication Transport Layer Security (mTLS), SSH, PGP, IPsec, and/or SSL, etc. The collection point 120 may support data formats including but limited to JSON, CSV, Avro, ORC, HTML, XML, and Parquet. The collection point 120 may be configured to write messages to clusters of a front gate processor 140 and communication with the front gate processor 140.

The data pipeline system 100 may include a distributed event streaming platform such as a front gate processor 140. The front gate processor 140 may be connected to and configured to receive data from the collection point 120. The front gate processor 140 may be implemented in an Apache Kafka cluster software system. The front gate processor 140 may include one or more message brokers and corresponding nodes. The message broker may for example be an intermediary computer program module that translates a message from the formal messaging protocol of the sender to the formal messaging protocol of the receiver. The message broker may be on a single node in the front gate processor 140. A message broker of the front gate processor 140 may run on a virtual machine (VM) on a remote server. The collection point 120 may send the incident data 102 to one or more of the message brokers of the front gate processor 140. Each message broker may include a topic to store similar categories of incident data 102. A topic may be an ordered log of events. Each topic may include one or more sub-topics. For example, one sub-topic may store incident data 102 relating to network problems and another topic may store incident data 102 related to security breaches from third party data producers. Each topic may further include one or more partitions. The partitions may be a systematic way of breaking the one topic log file into many logs, each of which can be hosted on a separate server. Each partition may be configured to store as much as a byte of incident data 102. Each topic may be partitioned evenly between one or more message brokers to achieve load balancing and scalability. The front gate processor 140 may be configured to categorize the received data into a plurality of client categories, thereby forming a plurality of datasets associated with the respective client categories. These datasets may be stored separately within the storage device as described in greater detail below. The front gate processor 140 may further transfer data to storage and to processors for further processing.

For example, the front gate processor 140 may be configured to assign particular data to a corresponding topic. Alert sources may be assigned to an alert topic, and incident data may be assigned to an incident topic. Change data may be assigned to a change topic. Problem data may be assigned to a problem topic.

The data pipeline system 100 may include a software framework for data storage 150. The data storage 150 may be configured for long term storage and distributed processing. The data storage 150 may be implemented using, for example, Apache Hadoop. The data storage 150 may store incident data 102 transferred from the front gate processor 140. In particular, data storage 150 may be utilized for distributed processing of incident data 102, and Hadoop distributed file system (HDFS) within the data storage may be used for organizing communications and storage of incident data 102. For example, the HDFS may replicate any node from the front gate processor 140. This replication may protect against hardware or software failures of the front gate processor 140. The processing may be performed in parallel on multiple servers simultaneously.

The data storage 150 may include an HDFS that is configured to receive the metadata (e.g., incident data). The data storage 150 may further process the data utilizing a MapReduce algorithm. The MapReduce algorithm may allow for parallel processing of large data sets. The data storage 150 may further aggregate and store the data utilizing Yet Another Resource Negotiation (YARN). YARN may be used for cluster resource management and planning tasks of the stored data. For example, a cluster computing framework, such as the processing platform 160, may be arranged to further utilize the HDFS of the data storage 150. For example, if the data source 101 stops providing data, the processing platform 160 may be configured to retrieve data from the data storage 150 either directly or through the front gate processor 140. The data storage 150 may allow for the distributed processing of large data sets across clusters of computers using programming models. The data storage 150 may include a master node and an HDFS for distributing processing across a plurality of data nodes. The master node may store metadata such as the number of blocks and their locations. The main node may maintain the file system namespace and regulate client access to said files. The main node may comprise files and directories and perform file system executions such as naming, closing, and opening files. The data storage 150 may scale up from a single server to thousands of machines, each offering local computation and storage. The data storage 150 may be configured to store the incident data in an unstructured, semi-structured, or structured form. In one example, the plurality of datasets associated with the respective client categories may be stored separately. The master node may store the metadata such as the separate dataset locations.

The data pipeline system 100 may include a real-time processing framework, e.g., a processing platform 160. In one example, the processing platform 160 may be a distributed dataflow engine that does not have its own storage layer. For example, this may be the software platform Apache Flink. In another example, the software platform Apache Spark may be utilized. The processing platform 160 may support stream processing and batch processing. Stream processing may be a type of data processing that performs continuous, real-time analysis of received data. Batch processing may involve receiving discrete data sets processed in batches. The processing platform 160 may include one or more nodes. The processing platform 160 may aggregate incident data 102 (e.g., incident data 102 that has been processed by the front gate processor 140) received from the front gate processor 140. The processing platform 160 may include one or more operators to transform and process the received data. For example, a single operator may filter the incident data 102 and then connect to another operator to perform further data transformation. The processing platform 160 may process incident data 102 in parallel. A single operator may be on a single node within the processing platform 160. The processing platform 160 may be configured to filter and only send particular processed data to a particular data sink layer. For example, depending on the data source of the incident data 102 (e.g., whether the data is in-house data 103 or third party data 199), the data may be transferred to a separate data sink layer (e.g., data sink layer 170, or data sink layer 171). Further, additional data that is not required at downstream modules (e.g., at the artificial intelligence module 180) may be filtered and excluded prior to transferring the data to a data sink layer.

The processing platform 160 may perform three general functions. First, the processing platform 160 may perform data validation. The data's value, structure, and/or format may be matched with the schema of the destination (e.g., the data sink layer 170). Second, the processing platform 160 may perform a data transformation. For example, a source field, target field, function, and parameter from the data may be extracted. Based upon the extracted function of the data, a particular transformation may be applied. The transformation may reformat the data for a particular use downstream. A user may be able to select a particular format for downstream use. Third, the processing platform 160 may perform data routing. For example, the processing platform 160 may select the shortest and/or most reliable path to send data to a respective sink layer (e.g., sink layer 170 and/or sink layer 171).

In one example, the processing platform 160 may be configured to transfer particular sets of data to a data sink layer. For example, the processing platform 160 may receive input variables for a particular artificial intelligence module 180. The processing platform 160 may then filter the data received from the front gate processor 140 and only transfer data related to the input variables of the artificial intelligence module 180 to a data sink layer.

The data pipeline system 100 may include one or more data sink layers (e.g., data sink layer 170 and data sink layer 171). Incident data 102 processed from processing platform 160 may be transmitted to and stored in data sink layer 170. In one example, the data sink layer 171 may be stored externally on a particular client's server. The data sink layer 170 and data sink layer 171 may be implemented using a software such as, but not limited to, PostgreSQL, HIVE, Kafka, OpenSearch, and Neo4j. The data sink layer 170 may receive in-house data 103, which have been processed and received from the processing platform 160. The data sink layer 171 may receive third party data 199, which have been processed and received from the processing platform 160. The data sink layers may be configured to transfer incident data 102 to an artificial intelligence module 180. The data sink layers may be data lakes, data warehouses, or cloud storage systems. Each data sink layer may be configured to store incident data 102 in both a structured or unstructured format. Data sink layer 170 may store incident data 102 with several different formats. For example, data sink layer 170 may support data formats such as JavaScript Objection Notation (JSON), comma-separated value (CSV), Avro, Optimized Row Columnar (ORC), Hypertext Markup Language (HTML), Extensible Markup Language (XML), or Parquet, etc. The data sink layer (e.g., data sink layer 170 or data sink layer 171), may be accessed by one or more separate components. For example, the data sink layer may be accessed by a Non-structured Query language ("NoSQL") database management system (e.g., a Cassandra cluster), a graph database management system (e.g., Neo4j cluster), further processing programs (e.g., Kafka+Flink programs), and a relation database management system (e.g., postgres cluster). Further processing may thus be performed prior to the processed data being received by an artificial intelligence module 180.

The data pipeline system 100 may include an artificial intelligence module 180. The artificial intelligence module 180 may include a machine-learning component. The artificial intelligence module 180 may use the received data in order to train and/or use a machine learning model. The machine learning model may be, for example, a neural network. Nonetheless, it should be noted that other machine learning techniques and frameworks may be used by the artificial intelligence module 180 to perform the methods contemplated by the present disclosure. For example, the systems and methods may be realized using other types of supervised and unsupervised machine learning techniques such as regression problems, random forest, cluster algorithms, principal component analysis (PCA), reinforcement learning, or a combination thereof. The artificial intelligence module 180 may be configured to extract and receive data from the data sink layer 170.

Figure 2:
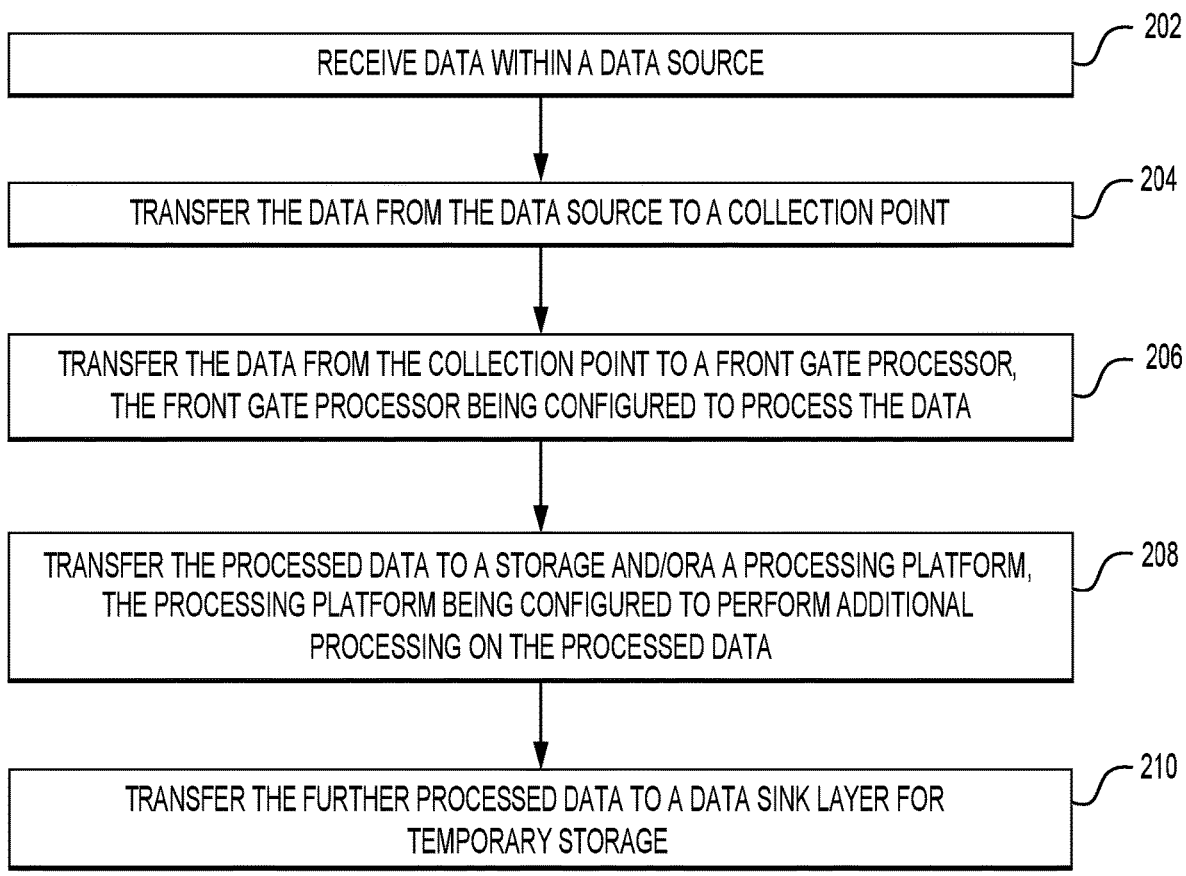
FIG. 2 depicts a flowchart of a method for receiving and processing data utilizing a data pipeline, according to one or more embodiments.

FIG. 2 depicts a flowchart of a method 200 for receiving and processing data utilizing a data pipeline, according to one or more embodiments. The flowchart 200 may depict an exemplary method for processing and transferring data for use of the data pipeline system 100 described in FIG. 1.

Exemplary process flows of the method 200, performed in accordance with the data pipeline system 100 above, are described hereinafter.

It should be understood that the steps shown and described herein, and the sequence in which they are presented, are merely illustrative such that various embodiments may include additional and/or fewer steps without departing from a scope of this disclosure.

At step 202, data may be received at a data source (e.g., by data source 101). The data received may include, for example, incident data 102. The data may be received from a connected system or from a third party data producer. The data may have been generated automatically by monitoring systems that generate alerts when a warning/critical event, outages, and/or failures in an IT environment occur. The received data may further include additional metadata. For example, an incident data alert may include metadata such as a reference code, a text-field describing the incident, and a time stamp indicating when an incident occurred.

Once the data is received at a data source, the data may then be collected by a secondary collection point (e.g., the secondary collection point 110) in case the data is from one or more third party data producers. In some embodiments, this steps of data collection by the secondary collection point may not be performed, for example when the data is from one or more in-house systems (e.g., when the data is in-house data 103). The secondary collection point may collect incident data 102 from a single third party data producer, or separate instances of a secondary collection point may collect incident data from one or more third party data producers. The secondary collection point may encrypt incident data 102 collected from the third party producers. The secondary collection point may perform initial processing of incident data 102. For example, the secondary collection point may apply transformation and encryption of the received data. The data may further be prioritized and transferred for further processing.

At step 204, the data may be transferred from a data source to a collection point (e.g., collection point 120). In one example, the collection point may receive the data directly from a data source (e.g., data source 101). In another example, the collection point may receive data that has been pre-processed by an additional collection point (e.g., the secondary collection point 110). The collection point may be configured to manage and automate the flow of data from the data source to downstream processing systems (e.g., the front gate processor 140). For example, the collection point may receive raw data and the raw data's corresponding fields such as source name and ingestion time. The collection point may create a flow algorithm with one or more processors to transfer and modify the received incident data prior to transferring the data for further processing. The collection point may create one or more flow algorithms. For example, a separate flow algorithm may be created for each secondary collection point that the collection point interacts with. The collection point may include processors configured to fetch incident data 102 from the secondary collection point using Site-to-Site protocol. Additionally, processors within the collection point may connect to one another to perform additional data processing or data transformation. For example, the collection point may perform effective load spreading of the received data and may be configured to provide high transaction rates of data. The collection point may further buffer and queue the data.

At step 206, the data, which may have been organized/processed at the collection point, is transferred to a front gate processor (e.g., the front gate processor 140). The front gate processor may perform additional processing on the received data. The received data may, for example, be categorized into a particular topic associated with a particular broker within the collection point. For example, alert sources may be assigned an alert topic, incident data may be assigned an incident topic, change data may be assigned a change topic, and problem data may be assigned a problem topic. The topics may further have corresponding partitions that are created in real time as data is received. The created partitions may then be accessed by further processing devices (e.g., the processing platform 160). The created partitions may also be accessed by storage devices (e.g., the data storage 150).

At step 208, the processed data (e.g., incident data 102 that has been processed by the front gate processor 140) may be transferred from the front gate processor to a storage system (e.g., data storage 150) and a processing platform (e.g., processing platform 160). The storage system may utilize nodes and HDFS to distribute processing and incident data 102 across a plurality of nodes. In one embodiment, the storage system may be a long-term storage system.

At step 208, the front gate processor (e.g., front gate processor 140) may also send the processed data (e.g., incident data 102 that has been processed by the front gate processor 140) to a processing platform (e.g., processing platform 160). The processing platform may aggregate real-time incident data for real-time processing through operators. A single operator may filter incident data and then connect to another operator to perform further data transformations. The processing platform may provide continuous real-time processing as the front gate processor sends incident data to the processing platform as a continuous stream of data. The processing platform may for example validate the received data, perform a data transformation on the data, and route the data to a data sink layer (e.g., data sink layer 170 and/or data sink layer 171). The processing platform may transform and enrich incident data and move it from one storage system to another in a continuous streaming mode. The processing platform may further be configured to output the further processed data (e.g., incident data 102 that been further processed by the processing platform 160) to a data sink layer.

At step 210, the further processed data may be transferred from the processing platform to one or more data sink layers (e.g., data sink layer 170 and/or data sink layer 171). Each data sink layer may provide temporary storage of the further processed data. The data sink layer may store the received incident data in an optimized format for retrieval and as well as further processing by a system (e.g., artificial intelligence module 180). For example, the optimized format for the processed data may be specific to a particular machine-learning module (e.g., artificial intelligence module 180). The optimized format may be dependent on what type of machine learning system will be retrieving the information. The data sink layer may be configured to store the received incident data in a structured or unstructured format on a cloud or local storage. Data sink layer may further encrypt the received incident data. The data sink layer may be configured to transfer the received incident data to an artificial intelligence system (e.g., artificial intelligence module 180) as requested.

For example, the data sink layer 170 may send the further processed incident data 102 to an artificial intelligence module 180. The artificial intelligence module 180 may be trained with the received incident data 102 utilizing supervised or unsupervised methods. The artificial intelligence module 180 may further use the received incident data 102 in use cases after the particular system is trained. The artificial intelligence module 180 may be configured to analyze, aggregate, compare, and/or contrast the received incident data 102 from one or more systems.

Figure 3:
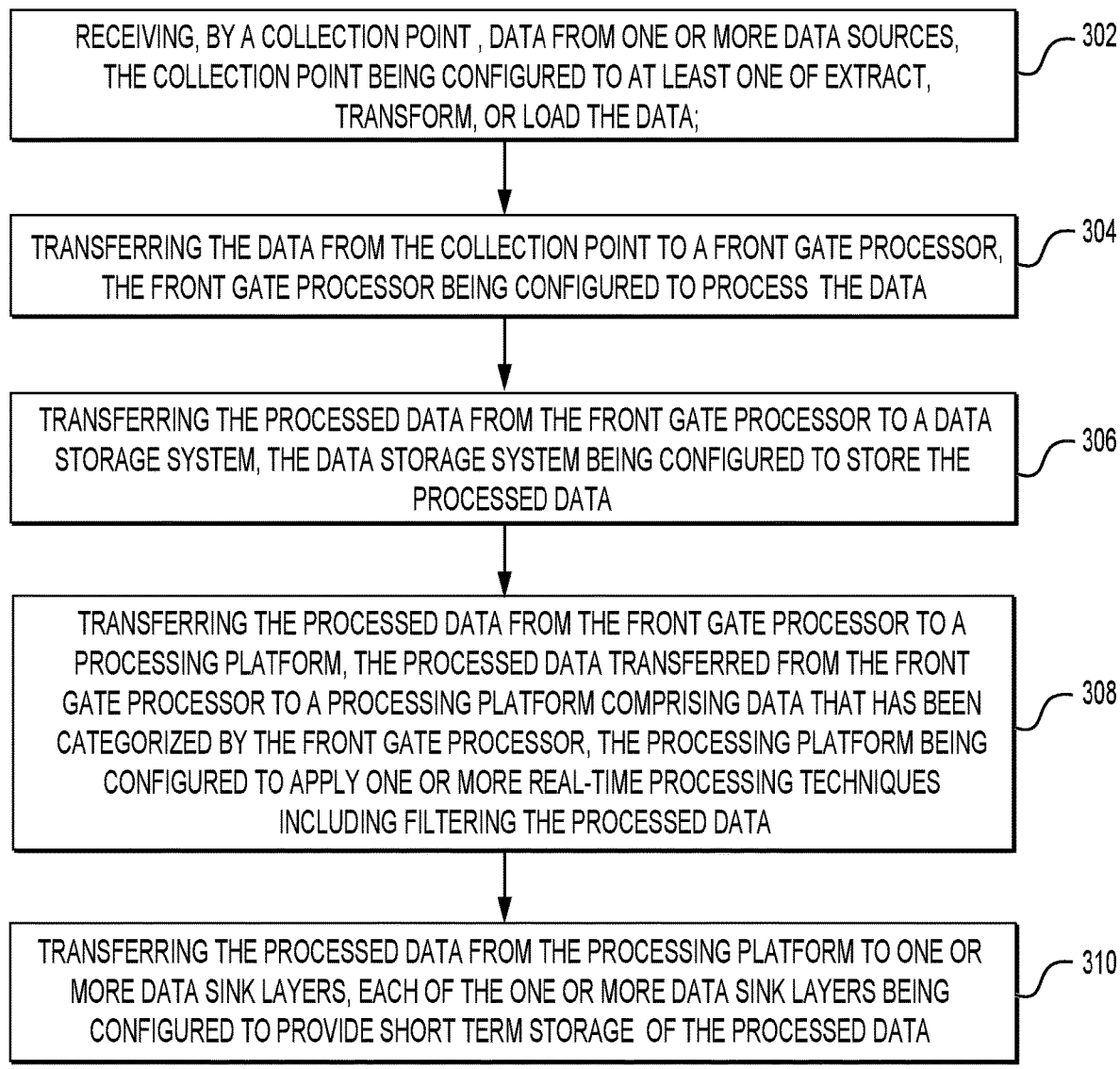
FIG. 3 depicts a flowchart of a method for processing data through a data pipeline, according to one or more embodiments.

FIG. 3 depicts a flowchart of a method 300 for processing data through a data pipeline, according to one or more embodiments.

At step 302, data from one or more data sources may be received by a collection point, the collection point being configured to at least one of extract, transform or load the data.

At step 304, the data may be transferred from the collection point to a front gate processor, the front gate processor being configured to process the data.

At step 306, processed data may be transferred from the front gate processor to a data storage system, the data storage system being configured to store the processed data.

At step 308, the processed data may be transferred from the front gate processor to a processing platform, the processed data transferred from the front gate processor to a processing platform comprising data that has been categorized by the front gate processor, the processing platform being configured to apply one or more real-time processing techniques including filtering the processed data.

At step 310, the processed data may be transferred from the processing platform to one or more data sink layers, each of the one or more data sink layers being configured to provide short term storage of the processed data.

In further aspects, the one or more data sources include data from a cloud-based environment and/or an in-house system.

In further aspects when the data is received from the cloud-based environment, the data is transferred to a secondary collection point configured to perform additional processing of the data prior to the collection point receiving the data.

In further aspects, the data from the one or more data sources includes at least one of: incident data, alert data, or change data.

In further aspects, the data from the one or more data sources includes data that has multiple formats.

In further aspects, the data from the one or more data sources changes format during the receiving of the data.

In further aspects, the processing of the data by the front gate processor includes: categorizing the data into a plurality of client categories, thereby forming a plurality of datasets associated with the respective client categories; wherein the plurality of datasets are stored separately in the data storage system.

In further aspects, transferring the processed data from the processing platform to one or more data sink layers includes transferring the plurality of datasets to a plurality of data sink layers based on the associated respective client categories In further aspects, the method 300 further includes determining that data is no longer being received by the collection point; upon determining that data is no longer being received by the collection point, transferring processed data from the data storage system to the processing platform.

In further aspects, the processed data transferred from the front gate processor to the processing platform includes stream processing data and batch processing data.

In further aspects, the method 300 further includes transferring the processed data from the one or more data sink layers to one or more machine learning systems.

Figure 4:
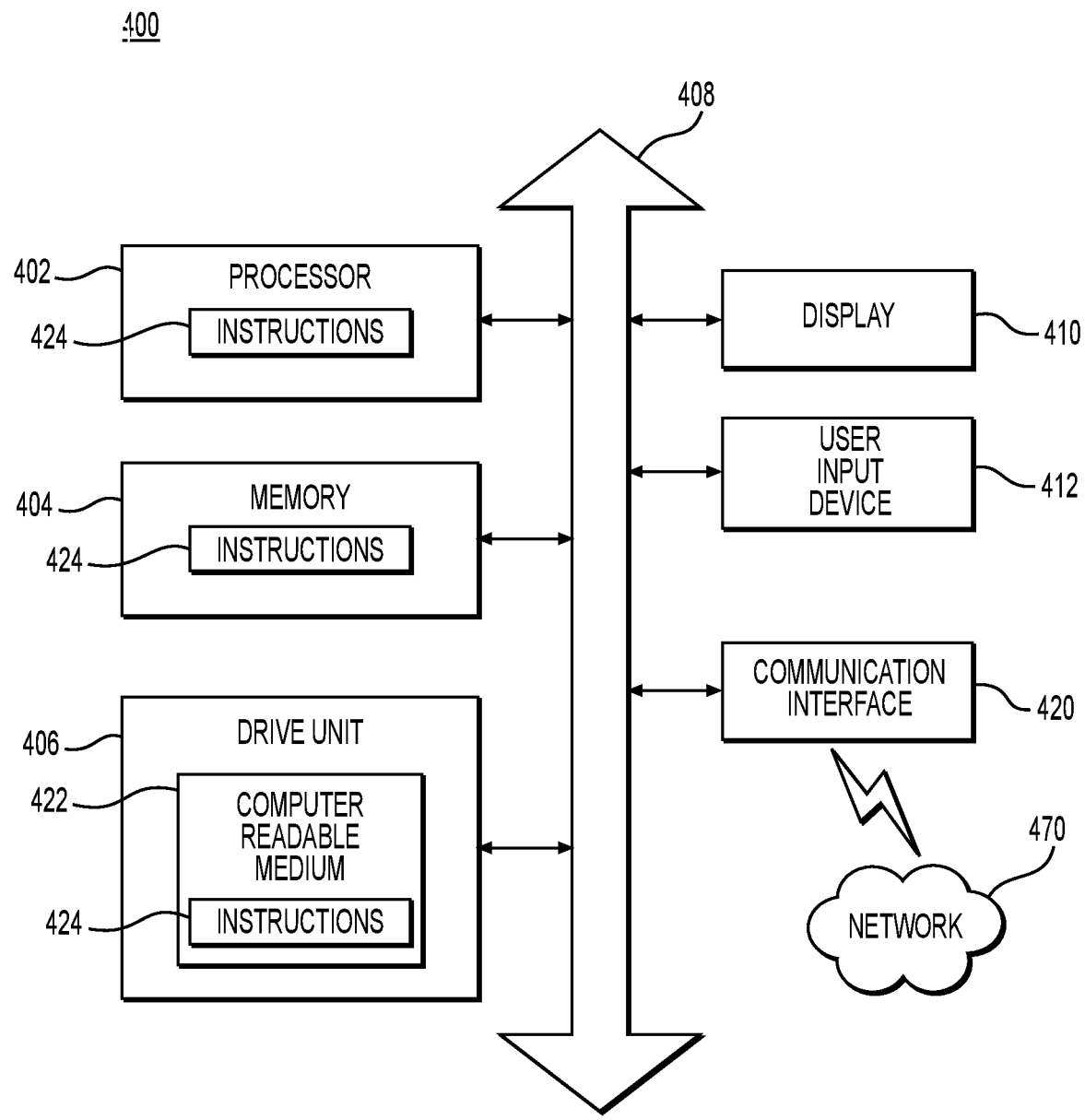
FIG. 4 illustrates an implementation of a general computer system that may execute techniques presented herein.

FIG. 4 illustrates an implementation of a general computer system that may execute techniques presented herein.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 4 illustrates an implementation of a computer system 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 400 can be implemented using electronic devices that provide voice, video, or data communication. Further, while a computer system 400 is illustrated as a single system, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 404 includes a cache or random-access memory for the processor 402. In alternative implementations, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the processor 402 executing the instructions stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display 410, such as a liquid crystal display (LCD), an organic light emitting diode (OLED), a flat panel display, a solid-state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 406.

Additionally or alternatively, the computer system 400 may include an input device 412 configured to allow a user to interact with any of the components of computer system 400. The input device 412 may be a number pad, a keyboard, or a cursor control device, such as a mouse, or a joystick, touch screen display, remote control, or any other device operative to interact with the computer system 400.

The computer system 400 may also or alternatively include drive unit 406 implemented as a disk or optical drive. The drive unit 406 may include a computer-readable medium 422 in which one or more sets of instructions 424, e.g. software, can be embedded. Further, the instructions 424 may embody one or more of the methods or logic as described herein. The instructions 424 may reside completely or partially within the memory 404 and/or within the processor 402 during execution by the computer system 400. The memory 404 and the processor 402 also may include computer-readable media as discussed above.

In some systems, a computer-readable medium 422 includes instructions 424 or receives and executes instructions 424 responsive to a propagated signal so that a device connected to a network 470 can communicate voice, video, audio, images, or any other data over the network 470. Further, the instructions 424 may be transmitted or received over the network 470 via a communication port or interface 420, and/or using a bus 408. The communication port or interface 420 may be a part of the processor 402 or may be a separate component. The communication port or interface 420 may be created in software or may be a physical connection in hardware. The communication port or interface 420 may be configured to connect with a network 470, external media, the display 410, or any other components in computer system 400, or combinations thereof. The connection with the network 470 may be a physical connection, such as a wired Ethernet connection or may be established wirelessly as discussed below. Likewise, the additional connections with other components of the computer system 400 may be physical connections or may be established wirelessly. The network 470 may alternatively be directly connected to a bus 408.

While the computer-readable medium 422 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 422 may be non-transitory, and may be tangible.

The computer-readable medium 422 can include a solid-state memory such as a memory card or other package that houses one or more non-volatile read-only memories. The computer-readable medium 422 can be a random-access memory or other volatile re-writable memory. Additionally or alternatively, the computer-readable medium 422 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 400 may be connected to a network 470. The network 470 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 470 may include wide area networks (WAN), such as the Internet, local area networks (LAN), campus area networks, metropolitan area networks, a direct connection such as through a Universal Serial Bus (USB) port, or any other networks that may allow for data communication. The network 470 may be configured to couple one computing device to another computing device to enable communication of data between the devices. The network 470 may generally be enabled to employ any form of machine-readable media for communicating information from one device to another. The network 470 may include communication methods by which information may travel between computing devices. The network 470 may be divided into sub-networks. The sub-networks may allow access to all of the other components connected thereto or the sub-networks may restrict access between the components. The network 470 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the disclosure.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as falling within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for processing data through a data pipeline, the method performed by one or more processors and including:
    receiving, by a collection point, data from one or more data sources, the collection point being configured to at least one of extract, transform, or load the data, wherein the data comprises incident data of an incident in which a computer system does not perform as expected;

transferring the data from the collection point to a front gate processor, the front gate processor being configured to process the data;

transferring the processed data from the front gate processor to a data storage system, the data storage system being configured to store the processed data;

transferring the processed data from the front gate processor to a processing platform, the processed data transferred from the front gate processor to a processing platform comprising data that has been categorized by the front gate processor, the processing platform being configured to apply one or more real-time processing techniques including filtering the processed data;

transferring the processed data from the processing platform to one or more data sink layers, each of the one or more data sink layers being configured to provide short term storage of the processed data in an optimized format and to output the processed data to an artificial intelligence module;

transferring the processed data from the one or more data sink layers to one or more machine learning systems;

automatically evaluating, with the one or more machine learning systems, the transferred processed data; and automatically implementing, by the one or more machine learning systems, a corrective action to the computer system.

2. The method of claim 1, wherein the one or more data sources include data from a cloud-based environment and/or an in-house system.

3. The method of claim 2, wherein when the data is received from the cloud-based environment, the data is transferred to a secondary collection point configured to perform additional processing of the data prior to the collection point receiving the data.

4. The method of claim 1, wherein the data from the one or more data sources includes at least one of: incident data, alert data, or change data.

5. The method of claim 1, wherein the data from the one or more data sources includes data that has multiple formats.

6. The method of claim 5, wherein the data from the one or more data sources changes format during the receiving of the data.

7. The method of claim 1, wherein the processing of the data by the front gate processor includes:

categorizing the data into a plurality of client categories, thereby forming a plurality of datasets associated with the respective client categories, wherein the plurality of datasets are stored separately in the data storage system.

8. The method of claim 7, wherein transferring the processed data from the processing platform to one or more data sink layers includes transferring the plurality of datasets to a plurality of data sink layers based on the associated respective client categories.

9. The method of claim 1, further including:

determining that data is no longer being received by the collection point; and upon determining that data is no longer being received by the collection point, transferring processed data from the data storage system to the processing platform.

10. The method of claim 1, wherein the processed data transferred from the front gate processor to the processing platform includes stream processing data and batch processing data.

11. The method of claim 1, further comprising:

transferring the processed data from the one or more data sink layers to one or more machine learning systems.

12. A system for a data pipeline, the system comprising:

a memory having processor-readable instructions stored therein; and at least one processor configured to access the memory and execute the processor-readable instructions to perform operations including:

receiving, by a collection point, data from one or more data sources, the collection point being configured to at least one of extract, transform, or load the data, wherein the data comprises incident data of an incident in which a computer system does not perform as expected;

transferring the data from the collection point to a front gate processor, the front gate processor being configured to process the data;

transferring the processed data from the front gate processor to a data storage system, the data storage system being configured to store the processed data;

transferring the processed data from the front gate processor to a processing platform, the processed data transferred from the front gate processor to a processing platform comprising data that has been categorized by the front gate processor, the processing platform being configured to apply one or more real-time processing techniques including filtering the processed data;

transferring the processed data from the processing platform to one or more data sink layers, each of the one or more data sink layers being configured to provide short term storage of the processed data in an optimized format and to output the processed data to an artificial intelligence module;

transferring the processed data from the one or more data sink layers to one or more machine learning systems;

automatically evaluating, with the one or more machine learning systems, the transferred processed data; and automatically implementing, by the one or more machine learning systems, a corrective action to the computer system.

13. The system of claim 12, wherein the one or more data sources include data from a cloud-based environment and/or an in-house system.

14. The system of claim 13, wherein when the data is received from the cloud-based environment, the data is transferred to a secondary collection point configured to perform additional processing of the data prior to the collection point receiving the data.

15. The system of claim 12, wherein the data from the one or more data sources includes at least one of: incident data, alert data, or change data.

16. The system of claim 12, wherein the data from the one or more data sources includes data that has multiple formats.

17. The system of claim 16, wherein the data from the one or more data sources changes format during the receiving of the data.

18. The system of claim 12, wherein the processing of the data by the front gate processor includes:

categorizing the data into a plurality of client categories, thereby forming a plurality of datasets associated with the respective client categories, wherein the plurality of datasets are stored separately in the data storage system.

19. The system of claim 18, wherein transferring the processed data from the processing platform to one or more data sink layers includes transferring the plurality of datasets to a plurality of data sink layers based on the associated respective client categories.

20. A non-transitory computer readable medium storing processor-readable instructions which, when executed by at least one processor, cause the at least one processor to perform operations including:
- receiving, by a collection point, data from one or more data sources, the collection point being configured to at least one of extract, transform, or load the data, wherein the data comprises incident data of an incident in which a computer system does not perform as expected;
- transferring the data from the collection point to a front gate processor, the front gate processor being configured to process the data;
- transferring the processed data from the front gate processor to a data storage system, the data storage system being configured to store the processed data;
- transferring the processed data from the front gate processor to a processing platform, the processed data transferred from the front gate processor to a processing platform comprising data that has been categorized by the front gate processor, the processing platform being configured to apply one or more real-time processing techniques including filtering the processed data;
- transferring the processed data from the processing platform to one or more data sink layers, each of the one or more data sink layers being configured to provide short term storage of the processed data in an optimized format and to output the processed data to an artificial intelligence module;
- transferring the processed data from the one or more data sink layers to one or more machine learning systems;
- automatically evaluating, with the one or more machine learning systems, the transferred processed data; and
- automatically implementing, by the one or more machine learning systems, a corrective action to the computer system.

* * * * *